Nov. 26, 1929. E. LINDSEY 1,737,465
WATER SWIVEL FOR USE IN WELL DRILLING
Filed Jan. 4, 1929
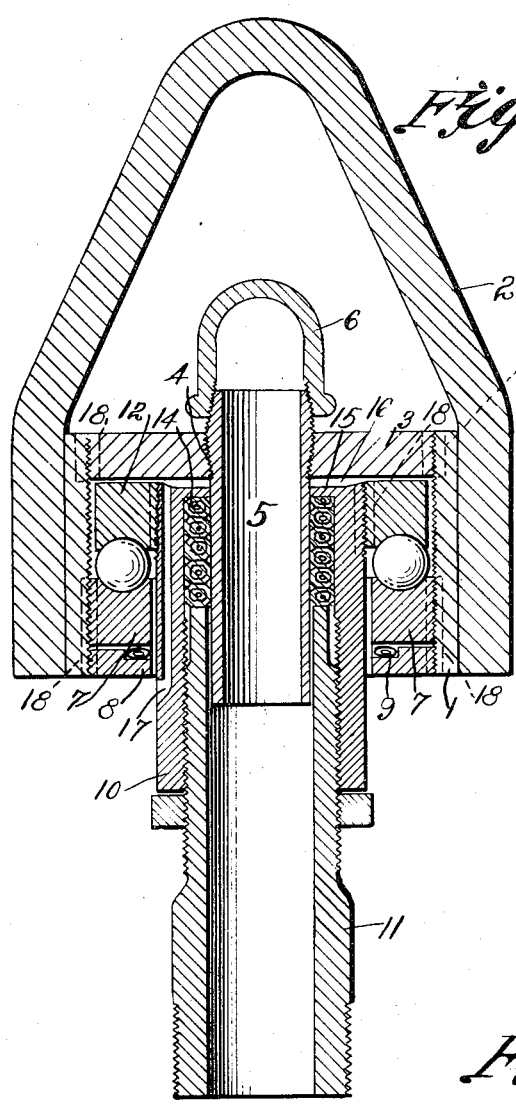
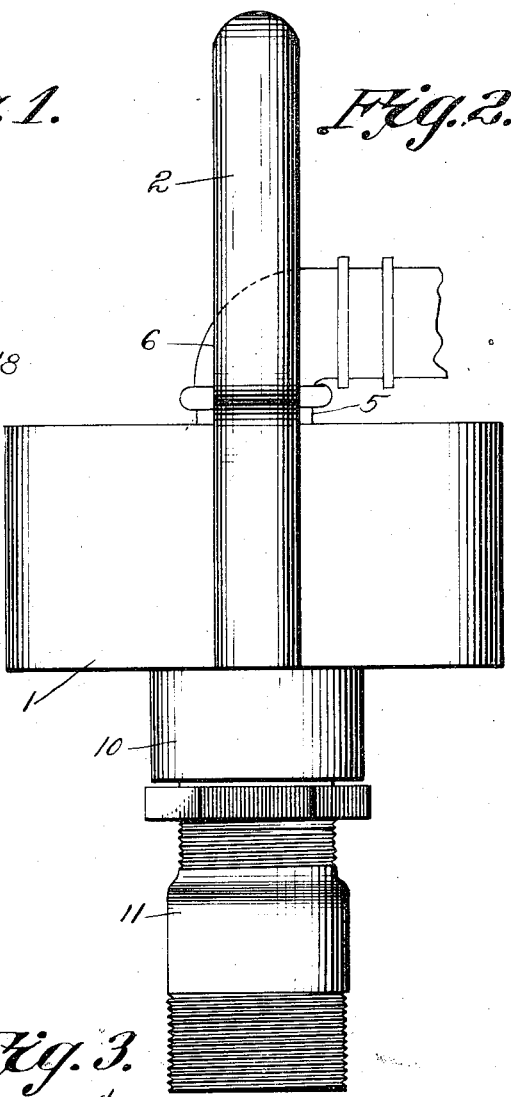
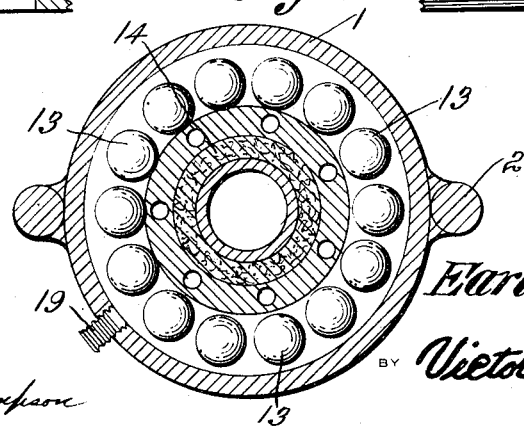
Earle Lindsey, INVENTOR
BY Victor J. Evans ATTORNEY
WITNESS: William Thompson Patented Nov. 26, 1929

1,737,465

UNITED STATES PATENT OFFICE

EARLE LINDSEY, OF TAYLORSVILLE, MISSISSIPPI

WATER SWIVEL FOR USE IN WELL DRILLING

Application filed January 4, 1929. Serial No. 330,210.

This invention relates to a ball bearing water swivel for use in well drilling, the general object of the invention being to provide a swivel, the parts of which are so arranged that there will be but little wear on the packing and the parts are easily adjustable to take up wear of the packing and on the balls, and one in which the parts are compactly arranged so that the length of the swivel is much shorter than the swivels' now in use, which permits the derrick to be somewhat lower.

Another object of the invention is to provide means for permitting the escape of mud and water from the parts and also to provide means whereby a tool can be readily passed into the escape passage to clean the same.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:—

Figure 1 is a longitudinal sectional view through the improved device.

Figure 2 is an elevation.

Figure 3 is a transverse sectional view.

In these views, the numeral 1 indicates the exterior member which is of circular shape in cross section and which is internally threaded, and 2 indicates the yoke which has its ends connected with exterior portions of the member 1. A closing member 3 is threaded in the upper end of the member 1 and said member 3 has a tapered threaded centrally arranged hole 4 therein to receive the tapered threaded part of the tube 5 to which the elbow 6 is connected, this elbow being connected by a pipe with the water supply. As shown, the tube 5 extends through the central portion of the member 1 and projects beyond the same.

A ball race member 7 is threaded in the member 1 and is held in adjusted position therein by the nut 8 which is threaded in the lower end of the member 1. This nut is formed with a groove to receive a washer 9 of felt or the like, which acts as a grease retainer. A sleeve 10 is threaded to the coupling 11 which is threaded at its lower end to fit the drill stem and a ball race member 12 is threaded to the upper end of the sleeve and occupies the space formed by the ball race member 7 and the member 3. Spherical members 13 are placed between the two ball races, and as will be seen, the sleeve 10 and the coupling 11, with the drill stem, are supported by the race 12 resting upon the balls 13, which in turn are supported by the race 7 connected with the member 1.

The tube 5 extends into the upper end of the coupling 11 and packing material 14 is placed in the space formed by the sleeve, the tube 5 and the upper end of the coupling 11, the upper end of the space being closed by an internal flange 15 on the sleeve 10. The flanged part of the sleeve is depressed so as to leave a space 16 between the upper end of the sleeve and the lower face of the member 3 and escape passages 17 are formed in the sleeve, the upper ends of which are connected with the space 16 and the lower ends open out through the side of the sleeve at a point below the nut 8, so that water passing between the tube 5, the coupling 11 and the packing will pass into the space 16 and escape through the passages 17. The lower end of each passage 17 is enlarged so that a wire or the like can be passed into the same to clean the same.

Dowels or set screws may be used for locking the various parts together, the drawing showing dowels 18 for locking the member 3 to the member 1 and said member 1 to the race 7 and nut 8 and the race 12 to the sleeve 10.

Figure 3 shows a plug 19 closing a grease opening in the member 1, whereby lubricant can be supplied to the anti-friction bearings.

From the foregoing it will be seen that the drill stem, with the coupling 11, sleeve 10 and ball race 12, are rotatably supported by the other protions of the device through means of the balls 13.

By locating the packing inside the anti-friction bearing, the swivel is shortened and made more compact, which permits the derrick to be lowered. The packing can be tightened easily without disconnecting the swivel from the hoisting line, drill stem or hose, or stopping the flow of water through the device. As before stated, the ball bearings can also be adjusted to take up wear through means of the race 7 threaded to the member 1 and the nut 8 for locking the race in adjusted position. The parts are of simple construction so that the device can be manufactured to sell at low cost and as the only exposed moving parts are small, smooth and circular and are located below the stationary outer parts which extend well beyond them, the swivel can be handled while in use without danger.

The sleeve is connected with the coupling by left hand threads and the elbow is connected with the tube by right hand threads. This arrangement prevents the parts from working loose and dropping the drill stem or casing. The left hand threads between the sleeve and coupling will tighten in use if the nut should become loose. As will be seen, the tube against which the packing works does not support any weight and can, therefore, have very thin walls so as to give in proportion to its capacity the smallest possible diameter where the packing engages it. This, with the ball bearing to support the weight, makes the device very easy running.

Roller thrust bearings may be used instead of the ball bearings.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. A swivel of the class described comprising a casing, a yoke connected therewith, a lower ball race removably arranged in the lower part of the casing, a cover for the top of the casing, a tube passing through the center of the cover and projecting into the casing, means for connecting a supply pipe to the upper end of the tube, a sleeve extending into the casing, a ball race on the sleeve arranged above the first race, balls between the two races, a coupling extending into the sleeve and threaded thereto, the tube extending into the upper end of the coupling and packing material placed in the space formed by the sleeve, the tube and the upper end of the coupling.

2. A swivel of the class described comprising a casing, a yoke connected therewith, a lower ball race removably arranged in the lower part of the casing, a cover for the top of the casing, a tube passing through the center of the cover and projecting into the casing, means for connecting a supply pipe to the upper end of the tube, a sleeve extending into the casing, a ball race on the sleeve arranged above the first race, balls between the two races, a coupling extending into the sleeve and threaded thereto, the tube extending into the upper end of the coupling, packing material placed in the space formed by the sleeve, the tube and the upper end of the coupling, said sleeve having a flange at its top extending over the material and a passage extending from the top of the sleeve through one side thereof below the casing whereby water passing the packing can escape.

3. A swivel of the class described comprising a ring-shaped member interiorly threaded, a yoke connected with the exterior portions of the member, a cover member threaded into the upper end of the first member and having a tapered threaded hole at its center, a tube having a tapered threaded portion engaging the hole, means for attaching a supply pipe to the upper end of the tube, a ball race member threaded into the lower part of the first member, a nut threaded into the lower end of the first member for holding the race member in position, a sleeve, a coupling extending into the same and threaded thereto, a ball race threaded to the upper end of the sleeve and arranged above the first race, balls arranged between the two races, said tube extending into the coupling, packing material placed in the space formed by the sleeve, the tube and the upper end of the coupling, said sleeve having an internal flange at its upper end covering the packing material, with a space between the flanged part and the cover member and said sleeve having passages therein connected with said space, the lower end of each passage being located below the nut and being enlarged to receive a clean-out tool.

In testimony whereof I affix my signature.

EARLE LINDSEY.